Aug. 31, 1965  J. J. BENSON  3,203,181
GAS TURBINE
Filed Oct. 18, 1962  6 Sheets-Sheet 1
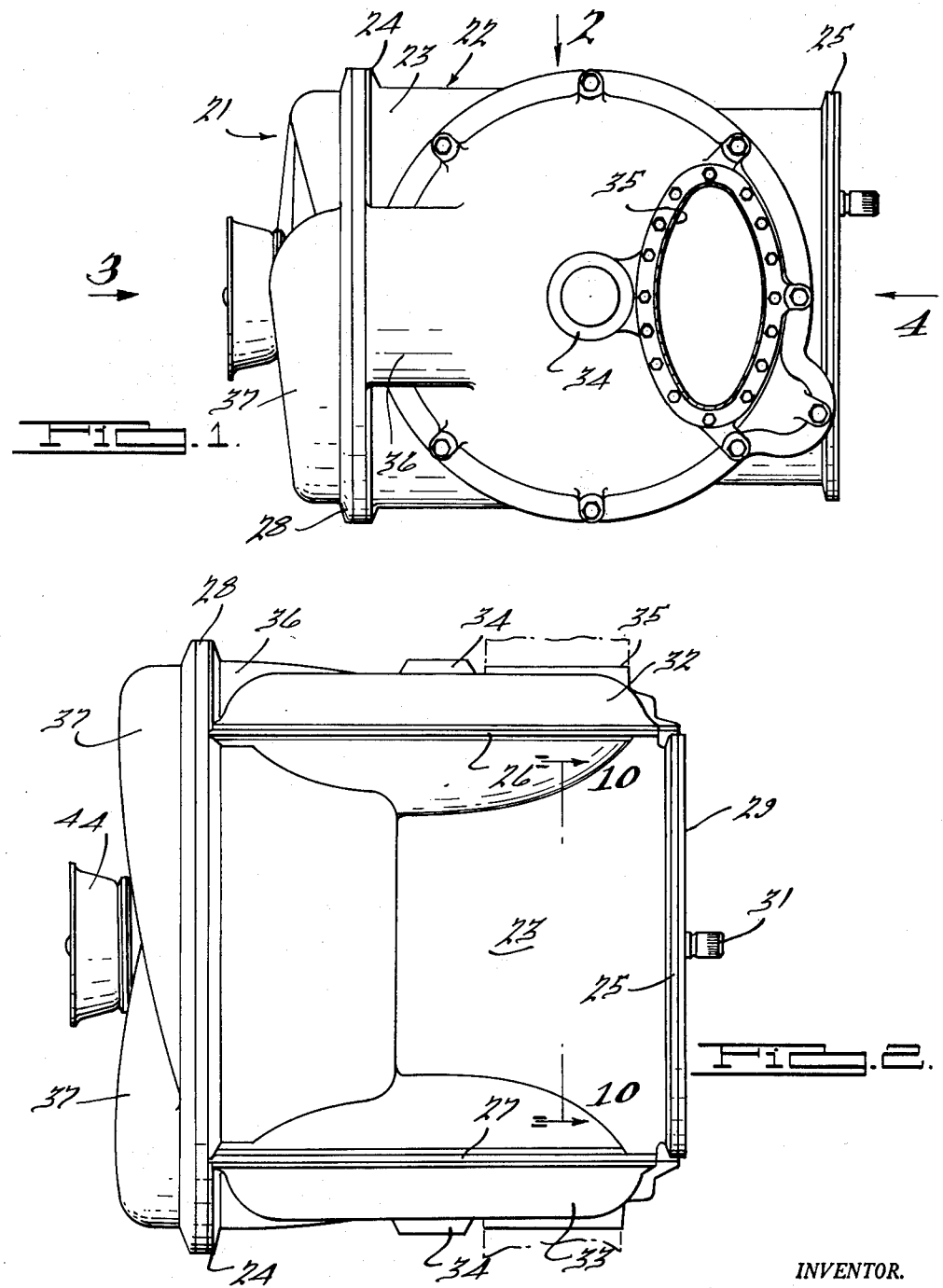
INVENTOR.
Jack J. Benson.
BY
Harness, Dickey & Pierce
ATTORNEYS INVENTOR.
Jack J. Benson
BY
Harness, Dickey & Pierce
ATTORNEYS

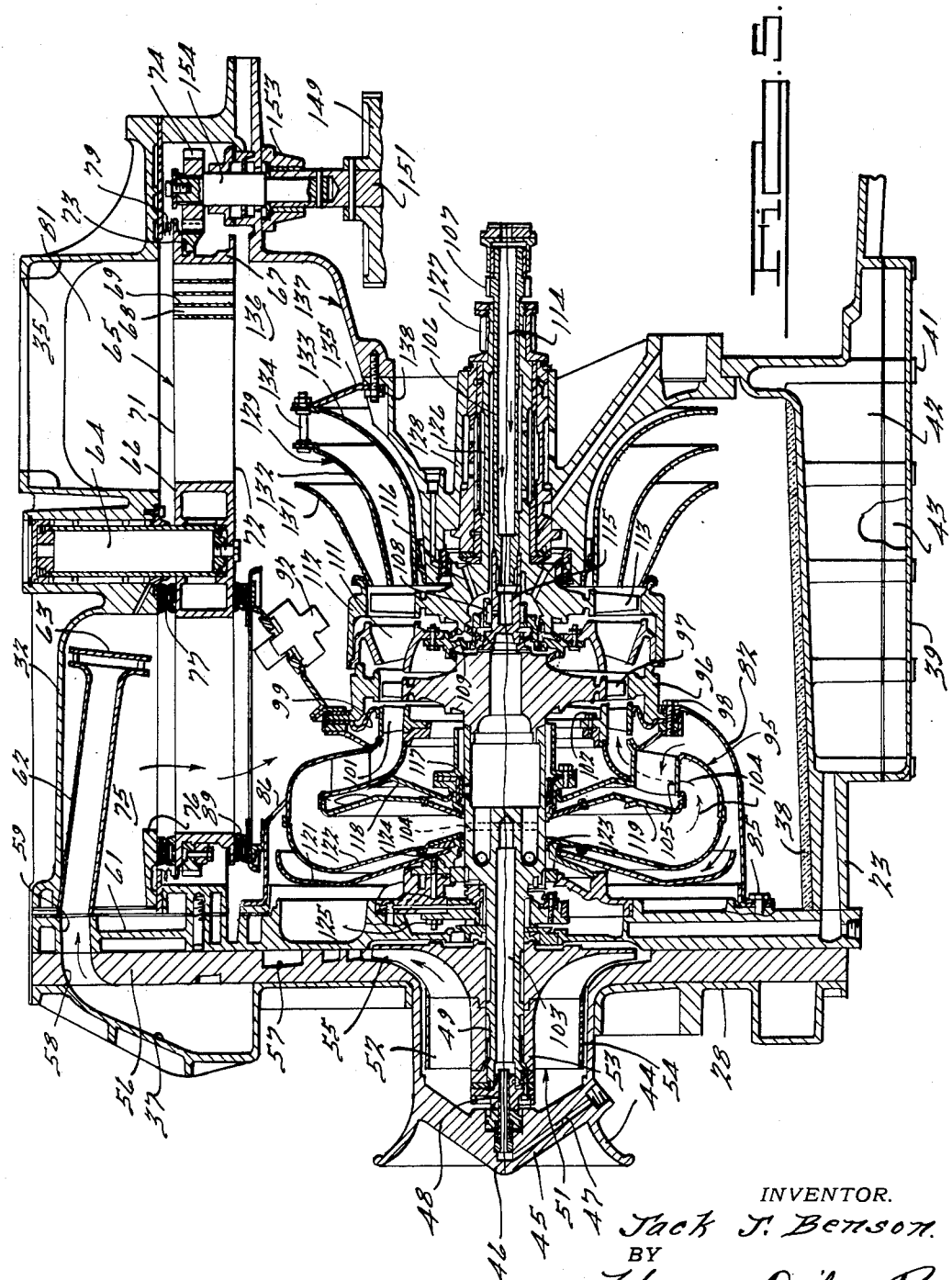

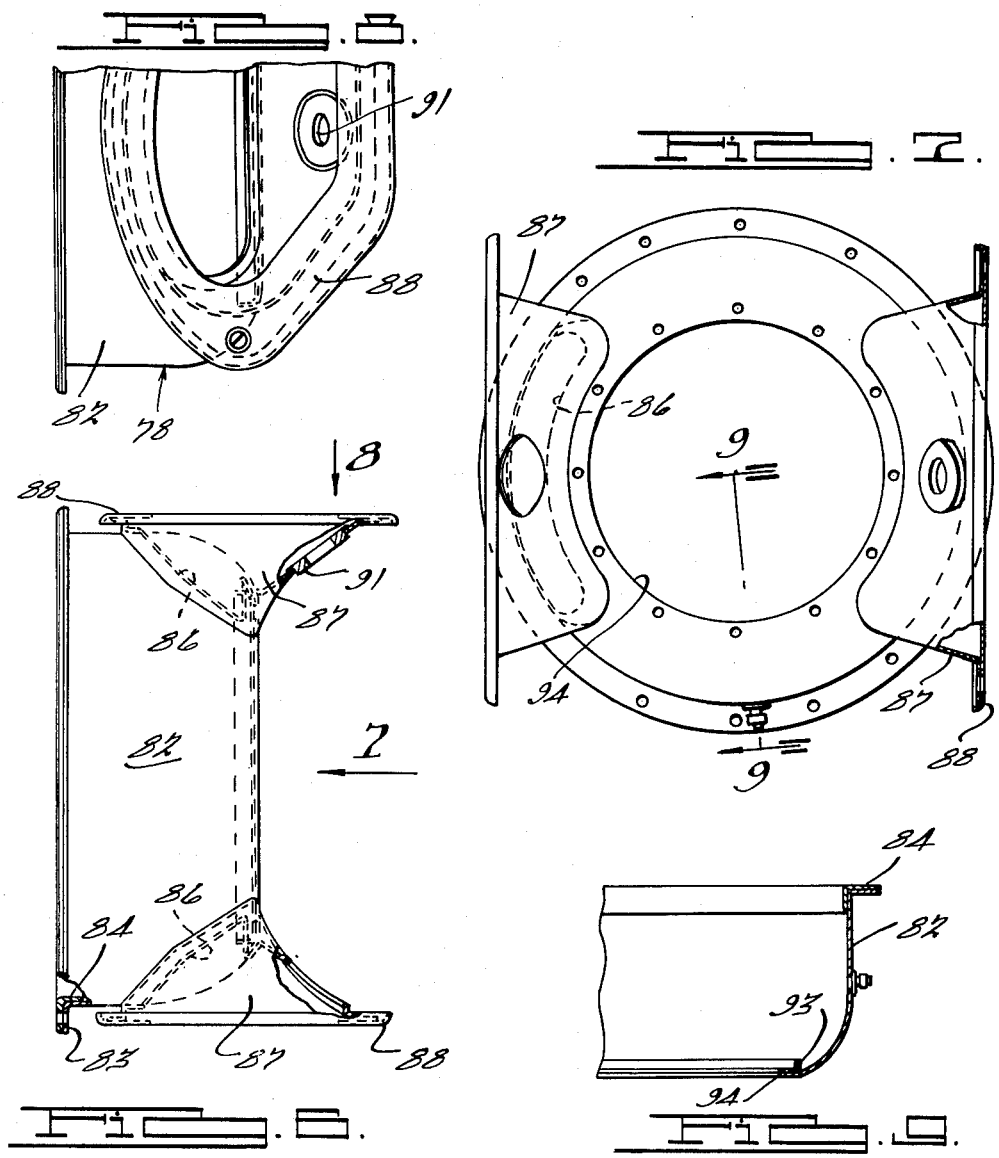

INVENTOR.
Jack J. Benson
BY
Barnes, Dickey & Pierce
ATTORNEYS

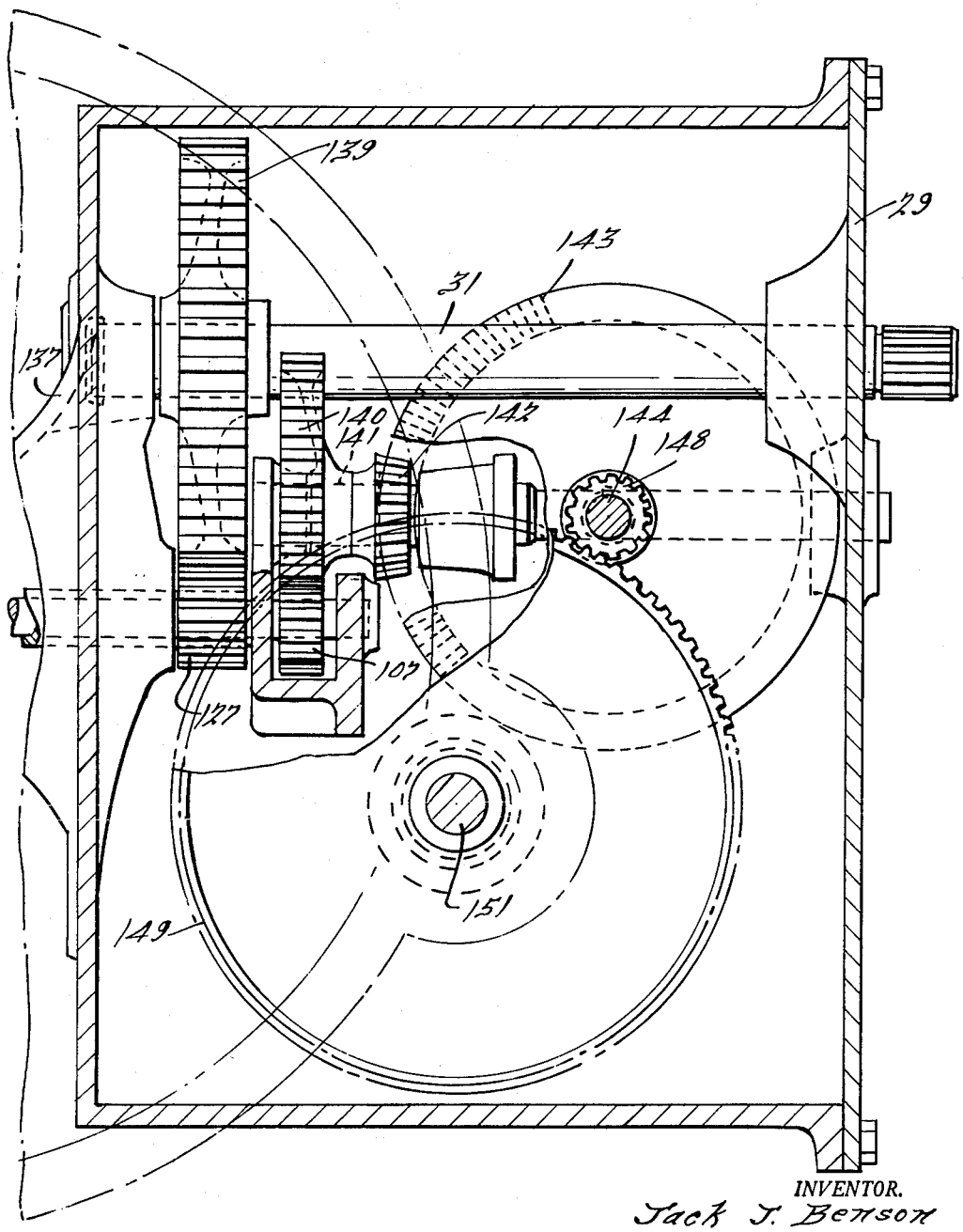

United States Patent Office 3,203,181
Patented Aug. 31, 1965

3,203,181
GAS TURBINE
Jack J. Benson, Lathrup Village, Mich., assignor to Williams Research Corporation, Walled Lake, Mich., a corporation of Michigan
Filed Oct. 18, 1962, Ser. No. 231,509
18 Claims. (Cl. 60—39.51)

This invention relates to gas turbines, and more particularly to turbines of the regenerative type in which the compressed air is preheated by the hot gases leaving the turbine.

It is an object of the present invention to provide a novel and improved regenerative gas turbine which achieves a high ratio of regenerator area to assembly volume, thus permitting an extremely compact unit for a given turbine output.

It is a further object of the invention to provide an improved turbine of this character in which the exposed portions of the assembly are relatively cool, thus permitting greater versatility in installing the turbine assembly without adversely affecting parts in the immediate vicinity.

It is another object to provide an improved turbine construction of this nature which permits free expansion and contraction of the highly heated assembly components without adversely affecting bearing alignment or the relatively cool outer structure.

It is also an object to provide an improved gas turbine construction having the above characteristics, in which novel means are provided for maintaining various engine components at relatively low temperatures during operation.

It is another object to provide an improved gas turbine exhaust diffuser construction which results in improved efficiency of exhaust gas flow to the regenerator matrices.

Other objects, features, and advantages of the present invention will become apparent from the subsequent description, taken in conjunction with the accompanying drawings, in which:

FIGURE 1 is a side elevational view of a suitable embodiment of the invention showing the general configuration of the housing;

FIGURE 2 is a top plan view taken in the direction of the arrow 2 of FIGURE 1 and showing the locations of the regenerator matrices on the sides of the assembly;

FIGURE 5 is a cross-sectional view taken along the line 5—5 of FIGURE 3 and showing both horizontal and vertical sections of the assembly interior;

FIGURE 6 is a top plan view of the dome-shaped structure which conducts the hot compressed air leaving the regenerators to the combustion chamber;

FIGURE 7 is a rear end elevational view of the dome taken in the direction of the arrow 7 of FIGURE 6;

FIGURE 8 is a fragmentary side elevational view of the dome taken in the direction of arrow 8 of FIGURE 6 and showing the configuration of the dome extension adjacent a regenerator matrix;

FIGURE 9 is a fragmentary cross-sectional view taken along the line 9—9 of FIGURE 7 and showing the configuration of the dome wall;

FIGURE 11 is a cross-sectional view taken along the line 11—11 of FIGURE 10 and further indicating the output gearing connections.

In general terms, the illustrated embodiment of the gas turbine of this invention comprises a centrifugal compressor, the compressor air being led to the outwardly facing surfaces of a pair of disk-shaped regenerator cores, these cores being disposed in parallel relation on opposite sides of the turbine assembly, somewhat in the manner of a "paddle wheel" arrangement. The inwardly flowing heated gases leaving the cores are conducted by a dome-shaped structure to an annular combustion chamber, the narrower rear edge of the dome supporting the combustion chamber and the wider forward edge being secured to the housing forwardly of the combustion chamber.

The burned gases are led out rearwardly from the combustion chamber through first and second turbine stages, a shaft connecting the first turbine stage to the compressor. This shaft has forward and rear bearings, the forward bearing being disposed between the compressor and combustion chamber and supported by the forward end of the housing The rear bearing is supported indirectly by the second stage nozzle ring housing, the latter being secured to the first stage turbine shroud which is in turn secured to the rear edge of the dome.

Since the forward edge of the dome is secured directly to the forward end of the housing, the dome not being otherwise rigidly connected to any stationary portion of the assembly, free axial expansion and contraction of the heated assembly components will be permitted without interference by the relatively cool outer portions of the assembly. Moreover, the major temperature gradient will occur in the main portion of the dome, which is a body of revolution and has a relatively thin cross-sectional area. The assembly will therefore be subject to a minimum of distortion due to temperature differences. The dome has two extensions facing the inner core surfaces for receiving heated compressed air, and a pair of bellows seals are disposed between these extensions and the cores. Free radial expansion and contraction of the dome will therefore be permitted, reducing any adverse effect on bearing alignment during operation.

A novel arrangement is also provided for conducting oil to and from the rear bearing, the flow path passing through the accessory shaft and the second stage turbine wheel. This avoids oil flow through heated passages and uses the lubricating oil to cool the second stage turbine hub. A plurality of concentric annular diffuser vanes of flared construction are mounted in nested relation at the outlet of the second stage turbine wheel leading to the exhaust plenum chamber, the inner surfaces of the regenerator cores being exposed to this chamber. The outwardly flowing exhaust gases are cooled by the rotating cores before leaving the housing through chambers formed outwardly of the cores.

Figure 3:
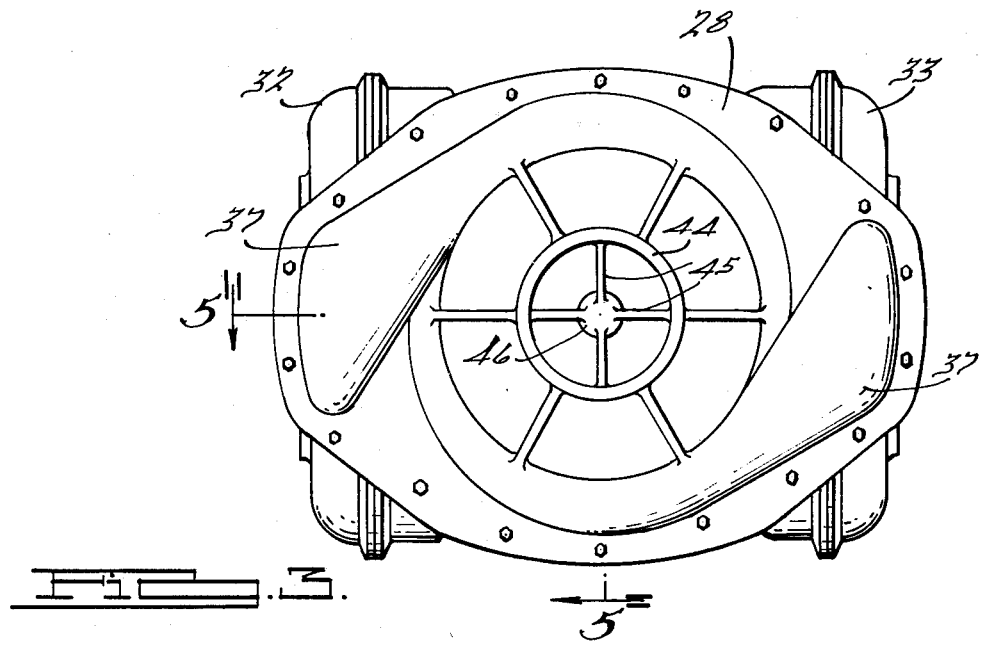
FIGURE 3 is a front end elevational view taken in the direction of the arrow 3 of FIGURE 1 and showing the ducts leading from the compressor to the regenerator matrices.
Figure 4:
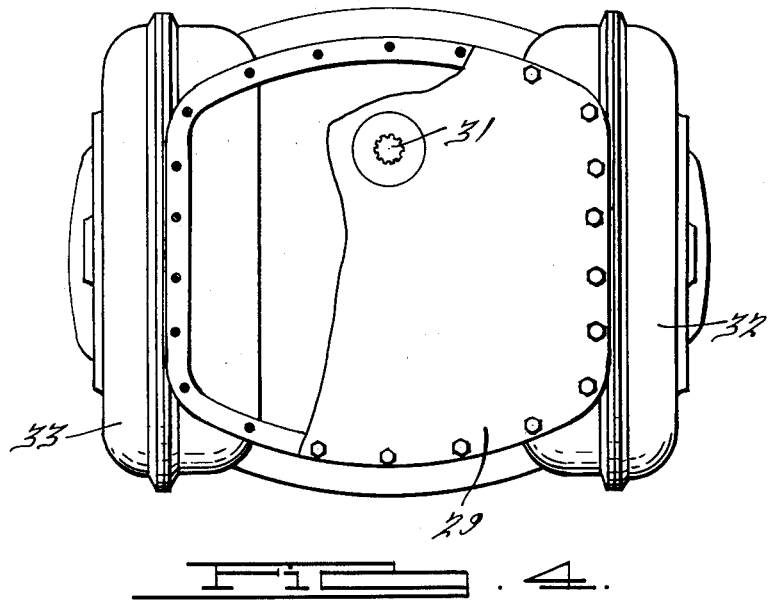
FIGURE 4 is a rear end elevational view taken in the direction of the arrow 4 of FIGURE 1 and showing the disposition of the output shaft.
Figure 10:
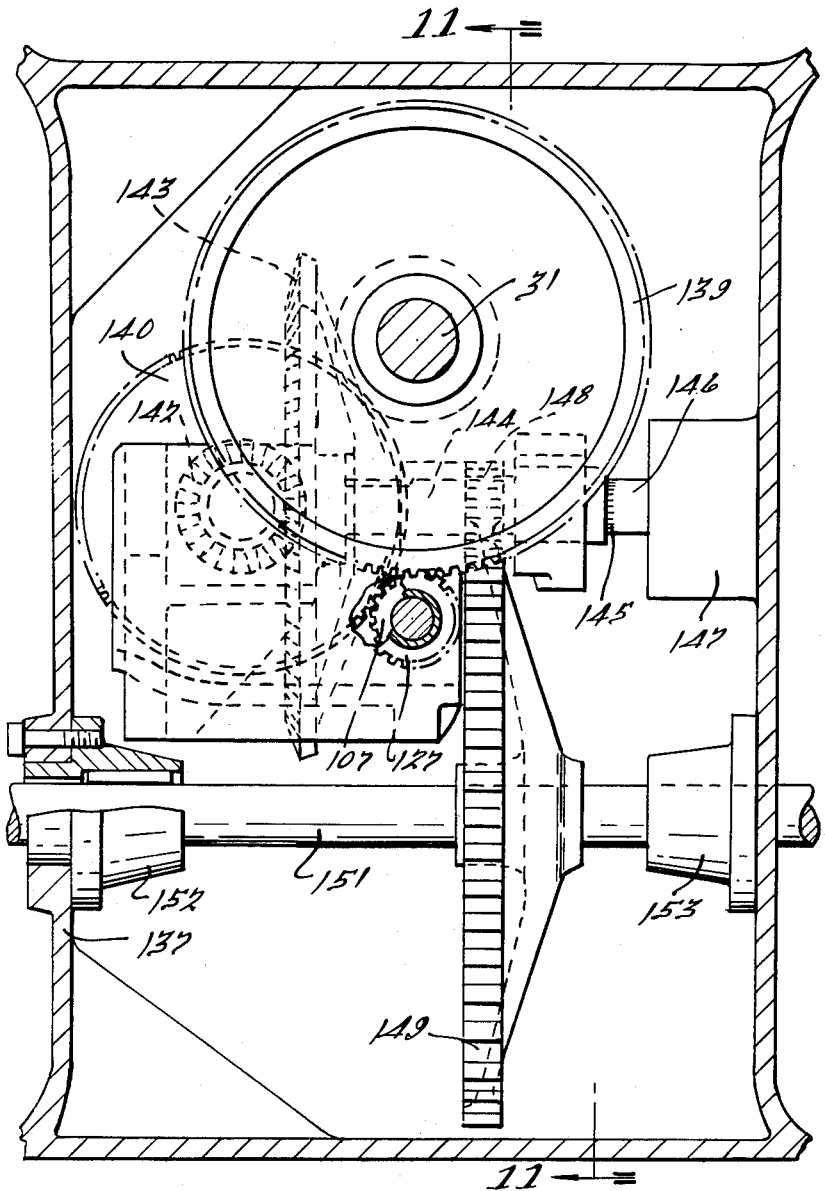
FIGURE 10 is an end cross-sectional view taken along the line 10—10 of FIGURE 2 but with housing portions removed, and showing the various output gear drives.

Referring more particularly to the drawings, the turbine assembly is generally indicated at 21 in FIGURE 1 and includes a housing generally indicated at 22, suitably fabricated of aluminum or metal having similar properties. The housing is of irregular shape but in the illustrated embodiment its overall dimensions are approximately the same in length, width and height. Housing 22 has a main portion 23 of generally circular shape with a forward flange 24, a rear flange 25, and outwardly facing side flanges 26 and 27 as seen in FIGURE 2. A forward cover 28 serving as a compressor housing is secured to flange 24 and a rear cover 29 is secured to flange 25, output shaft 31 extending through rear cover 29. A pair of side covers 32 and 33 are secured to flanges 26 and 27 respectively. Covers 32 and 33 are of generally circular shape and both support and enclose the two regenerator cores, described below. For this purpose the covers are provided with central bearing supports 34 as seen in FIGURES 1 and 2, and an exhaust port 35 of somewhat elliptical shape is formed at the rear portion of each of these covers. The forward portions of the covers have enlargements 36 for the receipt of compressed air from the two spirally shaped passages 37 formed in compressor housing 28 and seen in FIGURES 2 and 3.

As will be later seen, the sides, front and rear of housing 22 will be maintained at relatively cool temperature levels during operation because of the novel constructional features of turbine 21. The top and bottom of main housing portion 23, however, are exposed to the hot exhaust gases leaving the turbine, and in order to maintain these housing portions at satisfactorily low temperatures, they may be provided with layers of thermal insulation as well as with internal passages for conducting a fluid coolant such as oil or oil and water. FIGURE 5 shows the bottom of housing portion 23 as being provided with a thermal insulation layer 38, and with an outer member 39. This outer member, and the portion of housing member 23 to which it is attached by bolts 41, are provided with two separate sets of passages 42 and 43 which may conduct oil, or oil and water. Similar sets of passages (not shown) are preferably provided in the top of housing portion 23.

A flared intake 44 is secured to front cover 28 and has a plurality of radial vanes 45 extending from a hub 46. A fuel passage 47 is provided in one vane 45 and extends through hub 46 to a fuel inlet tube 48 within the forward end of a compressor shaft 49. A compressor inducer generally indicated at 51 is secured to shaft 49 as seen in FIGURE 5. Inducer 51 comprises a plurality of radially extending vanes 52, the inner ends of which are secured to a hub 53. A shroud 54 is brazed to the outer ends of vanes 52.

The centrifugal compressor itself is indicated at 55 in FIGURE 5 and has a plurality of outwardly spiraling vanes leading from inducer vanes 52 to a stationary diffuser plate 56 having passages 57 which lead to passages 37 of cover 28. The outer portions of plate 56 have passages 58 which direct the compressed air axially through passages 59 in the outer portions of a plate 61 disposed immediately rearwardly of plate 56. Diffuser tubes 62 lead from passages 59 to the interiors of side covers 32 and 33, the outer ends of these tubes being flared and having spaced disks 63 for aid in diffusion.

A shaft 64 is rotatably mounted in each hub 34 of covers 32 and 33, and a matrix type of regenerator or core generally indicated at 65 is secured to the inner end of each shaft 64. Each regenerator 65 comprises an inner hub 66, an outer rim 67, and a matrix or core portion having a large number of relatively small passages 68 defined by rings 69 of corrugated metal or a similar construction. Passages 68 extend between the flat end surfaces 71 and 72 of each matrix 65, and a driving gear 73 is provided on rim 67 and is driven by a pinion 74, seen in FIGURE 5. These pinions are driven by the turbine accessory drive in a manner later described.

Surface 71 of each core 65 faces a chamber 75 in its corresponding cover 32 or 33, this chamber being formed by a flat flange 76 formed on the inside of cover 32 or 33 which faces and is in spaced parallel relation with surface 71. Diffuser tubes 62 are disposed within chambers 75. A seal 77 is disposed between each flange 76 and surface 71, the seal being preferably of a pressurized or other construction capable of withstanding the relatively high pressures exerted on the seal due to the compressed air passing from chamber 75 to the core.

The configuration of each seal 77 is somewhat segmental in character, as seen partially in FIGURE 8 which shows the corresponding shape for an extension of a dome member generally indicated at 78 which receives the heated compressed air from the core and conducts it to the combustion chamber. A seal 79 intended to withstand relatively low pressure is disposed between cover 32 or 33 and rim 67 of each core 65. Seals 79 are of substantially circular configuration and are disposed outwardly of seals 77. Seals 79 serve to retain the exhaust gases at relatively low pressure as they pass from cores 65 to the chamber 81 in cover 32 or 33 which leads to exhaust port 35. Chamber 81 in each cover is of course separated from chamber 75 by the cover structure extending to flange 76.

The construction of dome 78 is best seen in FIGURES 6 to 9. The centrally apertured main section 82 of the dome is a body of revolution, that is, it has a circular shape with the forward portion being cylindrical and the rear portion curving inwardly to a narrower diameter. An outwardly extending flange 83 is formed at the forward end of section 82, and a reinforcing member 84 is secured to this flange. Flange 83 is rigidly secured to housing plate 61 by bolts 85, as seen in FIGURE 5. A pair of oppositely disposed openings 86 of somewhat elliptical shape are formed in the rear portion of dome section 82, and two outward extensions 87 are secured to section 82 surrounding these openings. Extensions 87 have outer flanges 88 engageable by seals 89, seen in FIGURE 5, these seals being disposed between flanges 88 and surfaces 72 of cores 65. One or both extensions 87 may be provided with apertured portions indicated at 91 for the reception of such accessories as temperature sensing devices for fuel governing purposes; such a device is indicated schematically at 92 in FIGURE 5. Seals 89 are preferably of a high pressure type similar to seals 77 and have the configuration described above with respect to seals 77 and flanges 88 of extensions 87. This configuration is seen best in FIGURE 8.

A reinforcing flange 93 is secured around the opening 94 at the rear end of dome section 82, as seen in FIGURE 9. This reinforcing flange serves to support a burner or combustion chamber of annular shape, generally indicated at 95, and also to support a shroud 96 for the first stage turbine wheel 97, as seen in FIGURE 5. Bolts 98 are used for this purpose, an annular seal 99 being also supported by member 93 and engaging the outer surface of a first stage nozzle vane structure 101. The latter structure is secured to burner 95 by bolts 102.

Combustion chamber 95 is disposed within dome section 82 in such manner that the heated compression air entering the interior of section 82 will flow into the openings provided in the combustion chamber for this purpose. Fuel will flow through passageway 103 in shaft 49 to radial passages 104 leading to the central portion of combustion chamber 95. The combustion gases will follow the wavy arrows in FIGURE 5, flowing past circumferentially spaced air passages 105 formed in the outlet section of combustion chamber 95. These passages are somewhat similar to those shown and described in Patent No. 3,011,311 issued to Sam B. Williams and Jack J. Benson on December 5, 1961.

First stage turbine 97 is secured to compressor shaft 49 which extends to the right of turbine 97 in FIGURE 5 and is splined to an accessory shaft 106 carrying an accessory driving pinion 107. A rear bearing 108 is provided for compressor shaft 49 between turbine 97 and the splined connection to shaft 106. Bearing 108 is supported by an annular web 109 secured to the inner edge of a second stage nozzle housing 111. The outer edge of this nozzle housing is secured to shroud 96 together with a shroud 112 for a second stage turbine wheel 113. Lubricant for bearing 108 is supplied through a central passageway 114 in shaft 106, this passageway leading to a passageway 115 in the extension of shaft 49 adjacent bearing 108. The oil is drained from bearing 108 through passages 116 in the hub of wheel 113. The lubricating oil thus avoids passage through any highly heated turbine components and serves as a coolant for wheel 113.

A seal 117 is provided for shaft 49 immediately rearwardly of combustion chamber 95, this seal being supported by an annular plate 118 secured to the inner portion of the annular combustion chamber outlet. The principal compressed air flow passing through circumferentially spaced passageways 105 in the combustion chamber outlet section will enter the space between web 118 and rear wall 119 of the combustion chamber before entering the combustion chamber apertures. An annular heat shield 121 is provided in spaced relation with the forward wall 122 of combustion chamber 95, and additional air from dome 78 will enter the combustion chamber through the annular space between plates 121 and 122. An additional seal 123 is provided for shaft 49 forwardly of combustion chamber 95 adjacent the inner edge of plate 121. These parts are secured to plate 61 by means of a member 124 and bolts 125.

A power drive shaft 126 extends from second stage turbine 113 and surrounds accessory shaft 106 in supporting relation therewith, a power pinion 127 being secured to the outer end shaft 126. This shaft is rotatably supported by a portion 128 of the housing.

An exhaust diffuser generally indicated at 129 is secured to the rear edge of second stage turbine shroud 112 and extends rearwardly therefrom as seen in FIGURE 5. Diffuser 129 comprises a plurality of flared annular members 131, 132 and 133 in spaced nested relation, these members being secured together by circumferentially spaced bolts 134. The inner edge of outermost member 131 is secured to shroud 112, and the outer edge of innermost member 133 is secured to housing member 128 by a plurality of flexible supports 135. Diffuser 129 serves to conduct the exhaust gases into an annular exhaust plenum chamber 136 disposed inwardly of cores 65 and exposed to the surfaces 72 thereof, chamber 136 being separated from the heated compressed air inlet passages by seals 89 and extensions 87 of dome 78.

The various gear drives are mounted within a gear housing of cage 137 secured to member 128 by bolts 138 as seeen in FIGURE 5. Power pinion 127 drives a gear 139 on shaft 31 supported by cage 137 and cover 29. Accessory pinion 107 drives a gear 140 on a stub shaft 141 within cage 137, as seen in FIGURE 11, this shaft carrying a bevel pinion 142 meshing with a bevel gear 143 on a transversely extending accessory shaft 144. Shaft 144 has a spline connection 145 to a shaft 146 which drives accessories such as an oil pump 147 and a governor (not shown). A pinion 148 on shaft 144 meshes with a gear 149 on a shaft 151 rotatably mounted with cage 137 by bearings 152 and 153; stub shafts 154 are fixed to the outer ends of shaft 151 and carry the generator driving pinion 74.

In operation of turbine 21, air will be inducted through compressor inducer 51 and compressed by compressor 55, the compressed air flowing through diffuser passages 57 and 37 to diffuser tubes 62 and into chambers 75. The air will then pass through passages 68 of rotating matrices 65 and into extensions 87 of dome sections 82. The air will then enter combustion chamber 95 disposed within dome 78 and will be mixed with fuel emanating from fuel orifices 104, the fuel being fed through passages 47 and 48 and shaft 49.

The combustion gases will flow through first nozzle vanes 101 to first turbine stage 97, this turbine stage driving compressor shaft 49 and accessory shaft 106. Accessory driving pinion 107 will drive through gear 139, pinion 142, gear 143, pinion 148 and shaft 146. Pinion 148 will drive regenerator pinions 74 through gear 149 and shaft 151.

Combustion gases leaving first stage turbine 97 will pass through second stage nozzle vanes 111 to second stage turbine 113, this turbine driving power pinion 127 through shaft 126. The power pinion will drive shaft 31 through gear 139.

The combustion gases leaving turbine 113 will pass through exhaust gas diffuser 129 into exhaust plenum chamber 136, from which they will flow outwardly through regenerator matrices 65 to chambers 81 and exhaust ports 35.

The advantages of the novel turbine construction will become apparent from the above description. Because of the novel arrangement of two generator cores in paddle-wheel fashion on the sides of the turbine, an extremely compact unit is obtained with a high ratio of regenerator area to assembly volume. The heated portions of the turbine assembly are all on the interior and are largely supported in cantilever fashion by securing them to the relatively cool external portions of the assembly only at one end. More particularly, combustion chamber 95 and first stage shroud 96 are directly secured to dome 78, the latter being secured to member 61 of the external housing at one end of the dome. First stage nozzle vanes 101 are directly secured to the combustion chamber, while second stage nozzle vanes 111 and second stage shroud 112 are directly secured to first stage shroud 96. Exhaust diffuser 129 is directly secured to shroud 112. The heated portions of the turbine are therefore free to expand and contract in an axial direction without affecting other parts of the turbine. Additionally, the outwardly facing extensions 87 of dome 78 are free to expand radially, thus preventing any adverse effect on bearing alignment and permitting close tip clearances to be maintained for the turbine blades.

The main temperature gradient between the hot and cold portions of the turbine will occur in the forward portion of dome 78 which is of circular shape and of thin cross section. This temperature gradient will therefore not cause any non-uniform distortion of the parts. Because of the regenerator and housing arrangement, the heated portions of the turbine will be confined to the interior and the sides of the turbine housing and will only be exposed to exhaust gases after they have been cooled by passing through the regenerator cores 65. The top and bottom of turbine housing 22 will be exposed to exhaust plenum chamber 136 containing relatively hot exhaust gases, but these portions of the housing will be maintained at relatively cool temperatures by insulation layers 38 and by the coolant flowing through passages 42 and 43. Because of the relative positions of the compressor, diffuser, regenerators, combustion chamber and turbine elements, the flow pattern for the compressed air and combustion gases will be devoid of sharp or abrupt changes in direction, thus contributing to turbine efficiency.

While it will be apparent that the preferred embodiment of the invention disclosed is well calculated to fulfill the objects above state, it will be appreciated that the invention is susceptible to modification, variation and changes without departing from the proper scope or fair meaning of the subjoined claims.

What is claimed is:

1. In combination, a gas turbine having a centrifugal compressor, a pair of rotatable regenerators on opposite sides of the compressor axis and on a common axis transverse to the compressor axis, covers for the outwardly facing surfaces of said regenerators, each cover having portions forming a compressed air inlet chamber and an exhaust chamber, means for conducting compressed air from said compressor to said compressed air inlet chambers, seals between said compressed air inlet chambers and said regenerators, an annular combustion chamber concentric with said compressor, a dome partially surrounding said combustion chamber and in spaced relation therewith, and means for conducting heated compressed air from the inwardy facing surfaces of said regenerators to the dome interior.

2. The combination according to claim 1, said last-mentioned means comprising a pair of extensions carried by said dome and extending outwardly therefrom, and seals disposed between said extensions and the inwardly facing surfaces of said regenerators.

3. In combination, a gas turbine having a centrifugal compressor, a pair of regenerators on opposite sides of the compressor axis and rotatable on axes transverse to said compressor axis, means for conducting compressed air to one surface of each said regenerators, a combustion chamber concentric with the compressor axis, a centrally apertured dome having a wider and a narrower end partially surrounding said combustion chamber in spaced relation therewith, a stationary turbine housing, means securing the wider end of said dome to said housing, the narrower end of said dome being in spaced relation with said housing, means for conducting heated compressed air from a second surface of each said regenerators to the interior of said dome, and means securing the narrower end of said dome to said combustion chamber in supporting relation therewith.

4. The combination according to claim 3, further provided with a turbine wheel at the outlet of said combustion chamber, and a shroud for said turbine wheel secured to and supported by the narrower end of said dome.

5. The combination according to claim 4, further provided with a first stage nozzle housing between said combustion chamber and said turbine wheel, and means securing said combustion chamber to said first stage nozzle housing in supporting relation therewith.

6. The combination according to claim 4, said turbine being further provided with a second stage nozzle housing and a second stage turbine wheel, and a second stage shroud for said second stage turbine wheel, said second stage nozzle housing and second stage shroud being secured to and supported by said first-mentioned shroud.

7. The combination according to claim 6, further provided with an exhaust gas diffuser in the form of a plurality of flared annular members in nested relation, said diffuser being secured to said second stage shroud.

8. In combination, a gas turbine having a stationary housing with a forward portion, top, bottom, and side portions, a centrifugal compressor rotatably mounted at the forward portion of said housing, a pair of compressed air inlet chambers formed in the side portions of said housing adjacent the forward housing portion, means in the forward housing portion for conducting compressed air outwardly and then axially into said chambers, a pair of parallel disk-shaped regenerators on opposite sides of the compressor axis inwardly of said side housing portions and rotatable on an axis transverse to said compressor axis, said chambers being connected to the outwardly facing surfaces of said regenerators, an annular combustion chamber concentric with the compressor axis within said housing and between said regenerators, means for conducting heated compressed air from the inwardly facing regenerator surfaces to said combustion chamber, nozzle vanes and a turbine wheel between said regenerators and connected to the outlet of said combustion chamber, portions of said housing forming an exhaust plenum chamber connected to the outlet of said turbine wheel and exposed to the inwardly facing surfaces of said regenerators and the top and bottom of said housing, and exhaust outlet chambers formed separately from said compressor inlet chambers in said side housing portions and exposed to the outwardly facing surfaces of said regenerators.

9. The combination according to claim 8, further provided with insulating layers on the internal surfaces of said housing top and bottom, and coolant passages in said housing top and bottom.

10. In combination, a gas turbine having a forward housing member, a centrifugal compressor having a compressor shaft extending through said housing member, a forward bearing for said shaft supported by said forward housing member, an annular combustion chamber surrounding said shaft rearwardly of said forward housing member, a first stage nozzle housing and a first stage turbine wheel, a shroud for said first stage turbine wheel, and means securing said combustion chamber, first stage nozzle housing and shroud to said forward housing member.

11. The combination according to claim 10, said last-mentioned means comprising a dome partially surrounding said combustion chamber in spaced relation therewith, one end of said dome being secured to said forward housing member, the other end of said dome being secured to said combustion chamber and first stage nozzle housing.

12. The combination according to claim 11, further provided with at least one rotatable regenerator disposed outwardly of said dome, an extension on said dome facing said regenerator, and sealing means between said extension and said regenerator permitting expansion and contraction of said extension in a radial direction with respect to the compressor axis.

13. The combination according to claim 10, further provided with a second stage nozzle housing secured to said shroud, a rear bearing for said compressor shaft, and means supporting said rear bearing and secured to said second stage nozzle housing.

14. In combination, a gas turbine housing having a forward housing member, a compressor having a shaft extending through said housing member, an annular combustion chamber surrounding said compressor shaft, a forward bearing for said shaft carried by said forward housing member, a first stage nozzle housing, first stage turbine wheel shroud, second stage nozzle housing, second stage turbine wheel shroud, an exhaust gas diffuser, and unitary means of relatively thin cross-sectional area concentric with said compressor shaft securing said combustion chamber, first stage nozzle housing, first stage turbine wheel shroud, second stage nozzle housing, second stage turbine wheel shroud and exhaust gas diffuser to said forward housing member.

15. In combination, a gas turbine housing having a forward housing member, a compressor having a shaft extending through said housing member, an annular combustion chamber surrounding said compressor shaft, a forward bearing for said shaft carried by said forward housing member, a nozzle housing and turbine wheel shroud, and unitary means of relatively thin cross-sectional area concentric with said compressor shaft securing said combustion chamber, nozzle housing and turbine wheel shroud to said forward housing member.

16. In combination, a gas turbine housing having an end member transverse to the turbine axis, a combustion chamber, nozzle housing and turbine wheel shroud within said housing, and unitary means comprising a body of revolution having a relatively thin cross-sectional area securing said combustion chamber, nozzle housing and shroud to said housing member.

17. In combination, a gas turbine housing having sides substantially parallel to the turbine axis and a housing member extending transversely to the turbine axis, a compressor concentric with the turbine axis and at one end of said housing, means for conducting compressed air from said compressor outwardly to at least one side of said housing and then radially inwardly, an annular combustion chamber within said housing, a dome partially surrounding and spaced from said combustion chamber, said dome comprising a body of revolution having a relatively thin cross-sectional area, means securing one portion of said dome to said housing member, means securing said combustion chamber to another portion of said dome whereby the dome supports said combustion chamber, at least one outward extension on said dome for receiving air delivered by said compressor to said one side of the turbine housing, and a connection between said extension and said one side of the turbine housing permitting radial movement of said extension with respect to said one housing side due to temperature changes.

18. In combination, a gas turbine housing having a forward housing member, a compressor having a shaft extending through said housing member, an annular combustion chamber surrounding said compressor shaft, a forward bearing for said shaft carried by said forward housing member, a nozzle housing and turbine wheel, a rear bearing for said compressor shaft, means on said nozzle housing supporting said rear bearing, a passageway in said compressor shaft for conducting lubricating oil to said rear bearing, and drain apertures in said turbine wheel for said lubricating oil.

References Cited by the Examiner

UNITED STATES PATENTS

| | | | |
|---|---|---|---|
| 2,613,501 | 10/52 | Price | 60—39.51 |
| 2,803,438 | 8/57 | Hryniszak | 165—9 |
| 2,880,972 | 4/59 | Williams | 60—39.51 |
| 3,039,265 | 6/62 | Williams et al. | 60—39.51 |
| 3,093,009 | 6/63 | Collman et al. | 60—39.51 |

FOREIGN PATENTS 1,067,638  10/59  Germany.

OTHER REFERENCES

"S.A.E. Journal" (Collman and Turunen), presented at S.A.E. Summer Meeting, Atlantic City, June 5, 1956. Page 54 relied on.

SAMUEL LEVINE, *Primary Examiner.*

ABRAM BLUM, *Examiner.*